United States Patent
Abdul Kadar et al.

(10) Patent No.: US 10,824,514 B2
(45) Date of Patent: Nov. 3, 2020

(54) METHOD AND SYSTEM OF AUTOMATING DATA BACKUP IN HYBRID CLOUD AND DATA CENTRE (DC) ENVIRONMENT

(71) Applicant: WIPRO LIMITED, Bangalore (IN)

(72) Inventors: Mohideen Abdul Kadar, Tiruchirappalli (IN); Chandramohan Achar, Bangalore (IN)

(73) Assignee: Wipro Limited, Bangalore (IN)

(*) Notice: Subject to any disclaimer, the term of this patent is extended or adjusted under 35 U.S.C. 154(b) by 214 days.

(21) Appl. No.: 15/942,453

(22) Filed: Mar. 31, 2018

(65) Prior Publication Data
US 2019/0258549 A1    Aug. 22, 2019

(30) Foreign Application Priority Data
Feb. 16, 2018 (IN) .............................. 201841006074

(51) Int. Cl.
G06F 11/14 (2006.01)
G06F 11/07 (2006.01)
H04L 12/24 (2006.01)

(52) U.S. Cl.
CPC ...... G06F 11/1464 (2013.01); G06F 11/0709 (2013.01); G06F 11/0793 (2013.01);
(Continued)

(58) Field of Classification Search
CPC .................................................... G06F 11/14
(Continued)

(56) References Cited

U.S. PATENT DOCUMENTS 7,509,468 B1    3/2009  Dalal et al.
8,412,680 B1    4/2013  Gokhale et al.
(Continued)

FOREIGN PATENT DOCUMENTS

WO         2010010393 A1    1/2010
WO    WO 2012/046576       4/2012

OTHER PUBLICATIONS

Extended European Search Report issued in the European Patent Office in counterpart European Application No. 18165354.4, dated Nov. 6, 2018, 8 pages.

*Primary Examiner* — Baoquoc N To
(74) *Attorney, Agent, or Firm* — Finnegan, Henderson, Farabow, Garrett & Dunner, LLP

(57) ABSTRACT

Disclosed subject matter relates to data backup operations including a method of automating data backup in Hybrid Cloud and Data Centre (DC) environment. A backup automation system receives a latest backup report including data of workloads associated with clients and detects missing workloads in the latest backup report by comparing the latest backup report with a master inventory report. Furthermore, the backup automation system identifies one or more parameters corresponding to the missing workloads and performs data backup operations for the missing workloads based on the one or more parameters. Further, the backup automation system updates timestamp for each of the missing workloads upon completion of the data backup operations for automating the data backup. The present disclosure ensures successful backup of each and every workload, in accordance with the SLA, by automatically performing the data backup operations, and also allows integrating data backup operations across customer preferred platforms.

20 Claims, 7 Drawing Sheets

(52) U.S. Cl.
CPC ...... *G06F 11/1451* (2013.01); *G06F 11/1458* (2013.01); *G06F 11/1461* (2013.01); *G06F 2201/80* (2013.01); *G06F 2201/84* (2013.01); *H04L 41/5019* (2013.01)

(58) Field of Classification Search
USPC .................................................. 707/640, 674
See application file for complete search history.

(56) References Cited

U.S. PATENT DOCUMENTS

| | | | |
|---|---|---|---|
| 2009/0063794 A1* | 3/2009 | Green | G06F 11/1461 711/162 |
| 2011/0125716 A1* | 5/2011 | Drews | G06F 11/079 707/674 |
| 2012/0123999 A1 | 5/2012 | Ashutosh et al. | |
| 2015/0032904 A1* | 1/2015 | Zhang | H04L 45/58 709/238 |
| 2016/0048408 A1 | 2/2016 | Madhu et al. | |

\* cited by examiner

(12) United States Patent
US 10,824,514 B2

METHOD AND SYSTEM OF AUTOMATING DATA BACKUP IN HYBRID CLOUD AND DATA CENTRE (DC) ENVIRONMENT

TECHNICAL FIELD

The present subject matter relates generally to data backup operations, and more particularly, but not exclusively to a method and a system for automating data backup in Hybrid cloud and Data Centre (DC) environment.

BACKGROUND

Generally, cloud environment provides ubiquitous, convenient, on-demand access to a shared pool of configurable computing resources. Typically, backup and restore is one of the most essential features in the cloud environment. On the other hand, Data Centre (DC) environment provides facilities composed of networked computers and storage that organizations use to organize, process, store and disseminate large amounts of data. Organizations that progressively depend on data and information for their regular operations may store and process their data in DCs and cloud facilities provided by service providers. Since the organizations rely on the service providers for backup and restore of the data related to the organization, they expect the services provided to be continuous and fault resilient service along with 100% data protection in accordance with a Service level Agreement (SLA) of the organization. Occurrence of unplanned downtime due to data loss or data corruption can cause irreplaceable loss to the organizations. However, to avoid occurrence of such situations, the service providers may have to continuously monitor whether all the data related to the organization is backed up, and also whether the backup was successfully performed in accordance with the SLA.

Currently, the existing techniques find it challenging to identify if all the required data is backed up in accordance with the SLA. Therefore, when natural disasters occur, the non-backed up data may be lost or corrupted, resulting in major loss of critical data of the organization.

Some of the existing techniques provide backup took to identify only the backed up data (consider backed up data in terms of workloads i.e. contents of a server including the operating system, middleware, applications and data, uploaded by one or more clients) which does not meet the SLA requirements. However, the backup tools may not identify all the workloads available in cloud or DC environment since master data used for evaluation may be different for different techniques. In some scenarios, the master data may include list of workloads backed up in a previous cycle. In some other scenarios, the master data may include list of workloads that are manually maintained by an administrator. Therefore, the master data may not contain details of all workloads that are supposed to be provisioned for back up due to process gap or human errors. In such scenarios, the backup tools provided by the existing techniques may not be able to discover all the workloads that are not included for back up though they are provisioned for backup, or the workloads that are not meeting the requirements of the SLA. Also, the existing techniques at present do not provide a mechanism for discovering the workloads that are backed up but, may not be meeting the requirements of the SLA.

Further, the existing techniques provide certain customizable templates which include data backup operations. However, these techniques do not provide an option to integrate the customizable templates with customer preferred platforms such as On-premises, public cloud and the like.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of automating data backup in Hybrid cloud and Data Centre (DC) environment. The method includes receiving, by a backup automation system, a latest backup report corresponding to one or more clients from a backup module associated with the backup automation system. The latest backup report comprises data of one or more workloads associated with the one or more clients. Further, the backup automation system detects one or more missing workloads in the latest backup report by comparing the latest backup report with a master inventory report. The one or more missing workloads includes at least one of, a workload from the one or more workloads having a non-compliant timestamp and/or dataset with respect to Service Level Agreement (SLA) of the corresponding one or more clients, and a workload from the one or more workloads not present in the latest backup report. Furthermore, the backup automation system identifies one or more parameters corresponding to the one or more missing workloads. Finally, the backup automation system, performs data backup operations for the one or more missing workloads based on the one or more parameters and updates timestamp for each of the one or more missing workloads upon completion of the data backup operations for automating the data backup.

Further, the present disclosure includes a backup automation system for automating data backup in Hybrid cloud and Data Centre (DC) environment. The backup automation system includes a processor and a memory communicatively coupled to the processor. The memory stores the processor-executable instructions, which, on execution, causes the processor to receive a latest backup report corresponding to one or more clients from a backup module associated with the backup automation system. The latest backup report comprises data of one or more workloads associated with the one or more clients. Further, the processor detects one or more missing workloads in the latest backup report by comparing the latest backup report with a master inventory report. The one or more missing workloads includes at least one of, a workload from the one or more workloads having a non-compliant timestamp and/or dataset with respect to Service Level Agreement (SLA) of the corresponding one or more clients, and a workload from the one or more workloads not present in the latest backup report. Furthermore, the processor identifies one or more parameters corresponding to the one or more missing workloads. Finally, the processor performs data backup operations for the one or more missing workloads based on the one or more parameters and updates timestamp for each of the one or more missing workloads upon completion of the data backup operations for automating the data backup.

Furthermore, the present disclosure includes a non-transitory computer readable medium including instructions stored thereon for automating data backup in Hybrid cloud and Data Centre (DC) environment, which when processed by at least one processor causes a backup automation system to perform operations including receiving a latest backup report corresponding to one or more clients from a backup module associated with the backup automation system. The latest backup report comprises data of one or more workloads associated with the one or more clients. Further, the instructions cause the processor to detect one or more missing workloads in the latest backup report by comparing the latest backup report with a master inventory report. The one or more missing workloads includes at least one of, a workload from the one or more workloads having a non-compliant timestamp and/or dataset with respect to Service Level Agreement (SLA) of the corresponding one or more clients, and a workload from the one or more workloads not present in the latest backup report. Furthermore, the instructions cause the processor to identify one or more parameters corresponding to the one or more missing workloads. Finally, the instructions cause the processor to perform data backup operations for the one or more missing workloads based on the one or more parameters and updates timestamp for each of the one or more missing workloads upon completion of the data backup operations for auto eating the data backup.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1A shows an exemplary architecture for automating data backup in Hybrid cloud and Data Centre (DC) environment in accordance with some embodiments of the present disclosure;

FIG. 1B, FIG. 1C, and FIG. 1D show flowcharts illustrating detailed process of automating data backup in Hybrid cloud and Data Centre (DC) environment in accordance with some embodiments of the present disclosure;

Figure 1A:
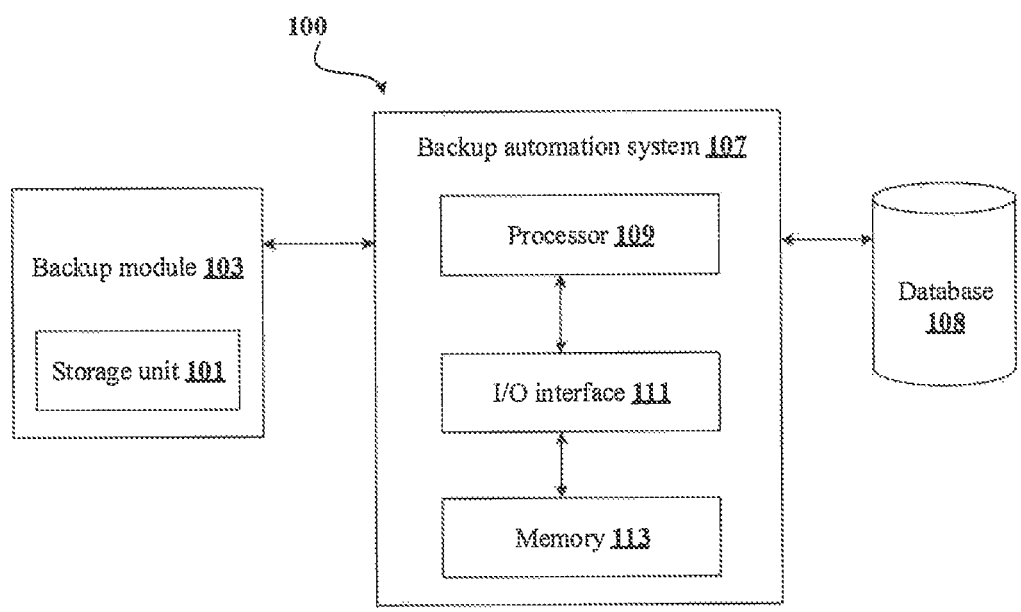

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as, "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for automating data backup in Hybrid Cloud and Data Centre (DC) environment. A backup automation system may query a backup module associated with the backup automation system for a latest backup report corresponding to one or more clients. Upon querying, the backup automation system may receive the latest backup report from the backup module. In some embodiments, the latest backup report may include data of one or more workloads associated with the one or more clients. However, the latest backup report may or may not include each of the one or more workloads that are provisioned in Hybrid Cloud and DC environment. Therefore, the backup automation system may compare the latest backup report with a master inventory report to detect one or more missing workloads in the latest backup report. In some embodiments, the one or more missing workloads may include one or more workloads having a non-compliant timestamp and/or dataset with respect to Service Level Agreement (SLA) of the corresponding one or more clients. In some other embodiments, the one or more missing workloads may include one or more workloads not present in the latest backup report. In some embodiments, the master inventory report may include complete record of the one or more workloads of the one or more clients, provisioned in the environment and supposed to be backed up. Upon detecting the one or more missing workloads, the backup automation system may identify one or more parameters corresponding to the one or more missing workloads.

In some embodiments, the one or more parameters may include, but not limited to, SLA of the one or more clients, environment related to the one or more missing workloads, type of the one or more missing workloads and, type of one or more policies associated with the one or more missing workloads, which are aligned to adhere with the SLA. Further, the backup automation system may perform the data backup operations for the one or more missing workloads based on the one or more parameters. Upon completion of the one or more data backup operations, the backup automation system may update a timestamp for each of the one or more missing workloads. In some embodiments, the data backup operations may include, but not limited to, backing up the one or more workloads and the one or more missing workloads in the backup module, determining whether the data backup operations meet requirement of the SLA, eliminating gap in rectifying one or more errors, automatically rectifying the one or more errors based on one or more error rectification solutions and performing self-learning to generate the one or more error rectification solutions.

In some embodiments, when the backup automation system encounters one or more errors while performing the data backup operations, the backup automation system may check for availability of one or more error rectification solutions in a database associated with the backup automation system. If the one or more error rectification solutions are available in the database, the backup automation system may retrieve the one or more error rectification solutions from the database and execute the one or more error rectification solutions to automatically rectify the one or more errors. Further, the backup automation system may generate a notification indicating an error rectification status upon executing the one or more error rectification solutions. As an example, the error rectification status may indicate "Error rectified".

In some embodiments, when the one or more error rectification solutions are unavailable in the database or when the one or more error rectification solutions fail to rectify the one or more errors, the backup automation system may generate another notification, in some embodiments, the notification may indicate requirement of manual interference for rectifying the one or more errors. In some embodiments, the notification may indicate an exemplary message such as "Error rectification failed. Contact administrator for further assistance". In some other embodiments, the notification may indicate an exemplary message such as "Error rectification solution unavailable. Contact administrator for further assistance". Further, the administrator may manually rectify the one or more errors that require manual interference, and store procedure for rectifying the one or more errors in the database.

Further, the present disclosure provides a feature wherein the one or more missing workloads provisioned for data backup are automatically detected using a master inventory report as opposed to existing techniques that use a backup database instead. The present disclosure ensures successful backup of each of the one or more workloads, in accordance with the SLA, by automatically performing the data backup operations. The present disclosure provides a feature wherein the one or more errors occurring in the data backup operations may be automatically detected and rectified. The present disclosure provides a feature wherein the backup automation system may automatically create new error rectification solutions or may update/modify the one or more error rectification solutions based on the procedure stored by the administrator.

A description of an embodiment with several components in communication with each other does not imply that all such components are required. On the contrary a variety of optional components are described to illustrate the wide variety of possible embodiments of the invention.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an exemplary architecture for automating data backup in Hybrid Cloud and Data Centre (DC) environment in accordance with some embodiments of the present disclosure.

The architecture 100 includes a backup module 103, a storage unit 101, a backup automation system 107 and a database 108. In some embodiments, the backup module 103 may be configured with the storage unit 101 as shown in the FIG. 1A. In some other embodiments, the backup module 103 may be associated with the storage unit 101. The backup module 103 may generate a latest backup report that includes data of one or more workloads associated with one or more clients that are backed up by the backup module 103 to the storage unit 101. In some embodiments, the backup module 103 may be provided by service providers of a cloud environment or a Data Centre (DC) environment.

Further, in some embodiments, the backup module 103 may be associated with the backup automation system 107 as shown in the FIG. 1A via a communication network (not shown in the FIG. 1A). As an example, the communication network may be at least one of, a wired communication network and a wireless communication network. In some other embodiments, the backup module 103 along with the storage unit 101 may be configured within the backup automation system 107.

Figure 1B:
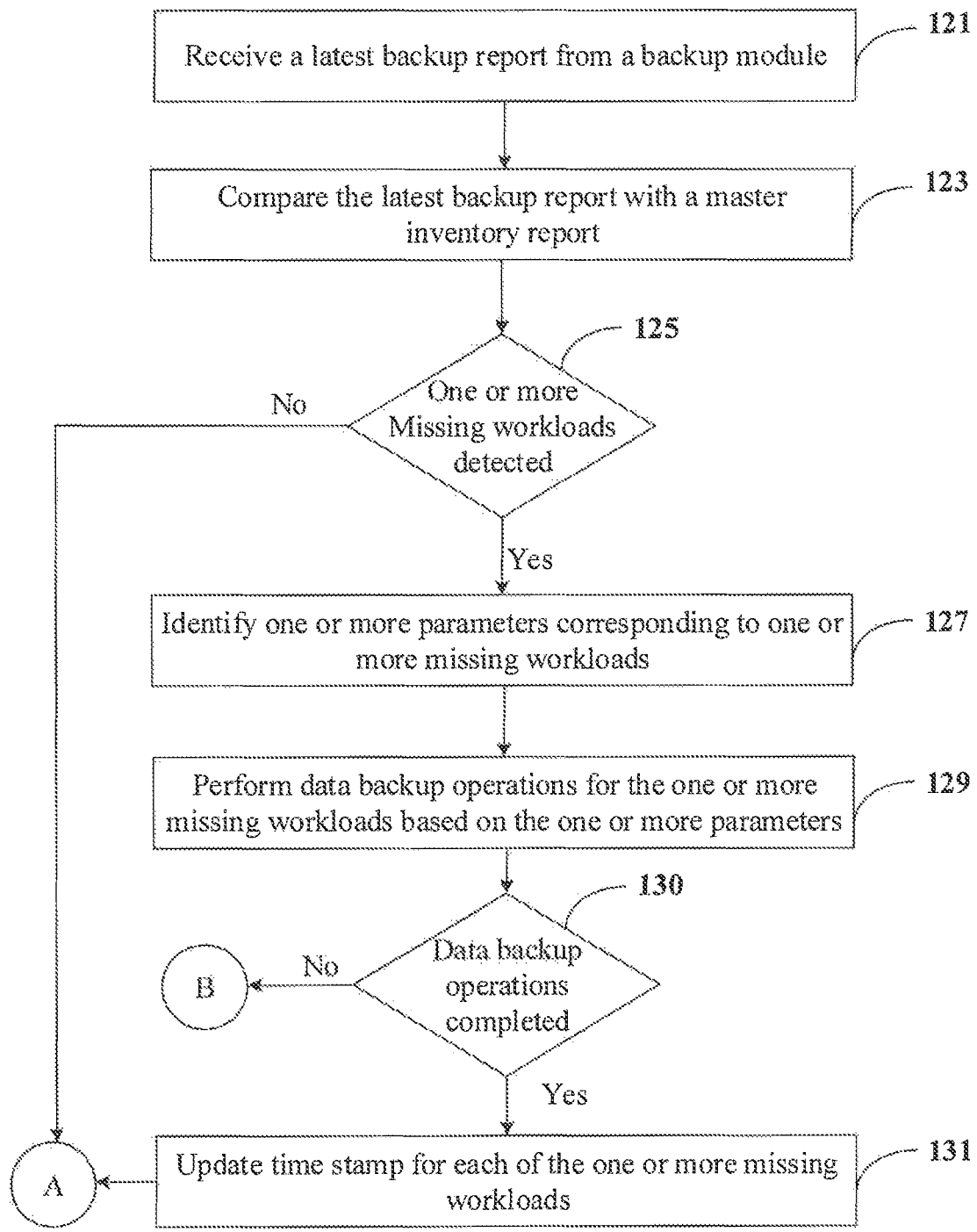

In some embodiments, the backup automation system 107 may include a processor 109, an Input/Output (I/O) interface 111 and a memory 113. The process of automating data backup in the Hybrid Cloud and the DC environment by the backup automation system 107 is explained below with the help of flowcharts shown in FIG. 1B, FIG. 1C and FIG. 1D.

At block 121 the I/O interface 111 may be configured to receive the latest backup report from the backup module 103. In some embodiments, the processor 109 may query the backup module 103 for the latest backup report corresponding to the one or more clients, through the I/O interface 111. The backup module 103 may in turn retrieve the latest backup report from the storage unit 101 and provide the latest backup report to the backup automation system 107.

At block 123, upon receiving the latest backup report, the processor 109 may compare the latest backup report with a master inventory report. In some embodiments, the master inventory report may include complete record of the one or more workloads of the one or more clients, supposed to be provisioned for the data backup. In some embodiments, the master inventory report may be a combined workload provisioned list from Hybrid Cloud and DC management portal appended with corresponding SLA of each of the one or more workloads. Further, in some embodiments, the master inventory report may be stored in the memory 113. In some other embodiments, the I/O interface 111 may be configured to receive the master inventory report from an external repository (not shown in the FIG. 1). In some embodiments, the external repository may further include, but not limited to, data related to, a database name, a hypervisor cluster or database instance name, backup catalogue definition with corresponding SLA, a hostname or instance name, an environment where the external repository is hosted, privileged accounts information, client information, configuration related to the one or more workloads like operating systems, database type, specification of resources provisioned and account information for numerous services that the one or more clients may be entitled to.

At block 125, the processor 109 checks whether one or more missing workloads are detected based on the comparison. In some embodiments, the one or more missing workloads may be the one or more workloads not present in the latest backup report. In some other embodiments, the one or more missing workloads may be the one or more workloads having a non-compliant timestamp and/or data set with respect to Service Level Agreement (SLA) of the corresponding one or more clients. If the one or more missing workloads are detected, the processor 109 may proceed to block 127 via "Yes", If the one or more missing workloads are not detected, the processor 109 may proceed to block 133 (A) via "No".

At block 127, the processor 109 may identify one or more parameters corresponding to the one or more missing workloads. In some embodiments, the one or more parameters may include, but not limited to, SLA of the one or more clients, environment related to the one or more missing workloads, type of the one or more missing workloads and, type of one or more policies associated with the one or more missing workloads, which are aligned to adhere with the SLA. As an example, the environment related to the one or more missing workloads may be a virtual environment, a database environment, a testing environment, a cloud environment and the like. As an example, type of the one or more missing workloads may be transactional workloads, business-critical workloads, disaster recovery workloads, web application related workloads and the like. As an example, the type of one or more policies may be named as "Gold level protection policy", "Silver level protection policy", "bronze level protection policy" and the like. In some embodiments, each type of the one or more policy may include a set of services/instructions that may be referred while performing data backup operations. Exemplary services provided under exemplary type of one or more policies may be as shown in the below Table 1.

or more workloads and the one or more missing workloads may be stored in the storage unit 101 associated with the backup module 103.

At block 130, the processor 109 may check whether the data backup operations are completed successfully. If the data backup operations are completed successfully, the processor 109 may proceed to block 131 via "Yes". If the data backup operations are not completed successfully, the processor 109 may proceed to block 147 (B) via "No".

At block 131, the processor 109 may update timestamp for each of the one or more missing workloads. At this stage, the processor 109 ensure that each of the one or more workloads listed in the master inventory report are backed up. However, the timestamp and/or the dataset associated with the one or more workloads and the one or more missing workloads that are backed up, may or may not be in accordance with the SLA of the corresponding one or more clients.

Figure 1C:
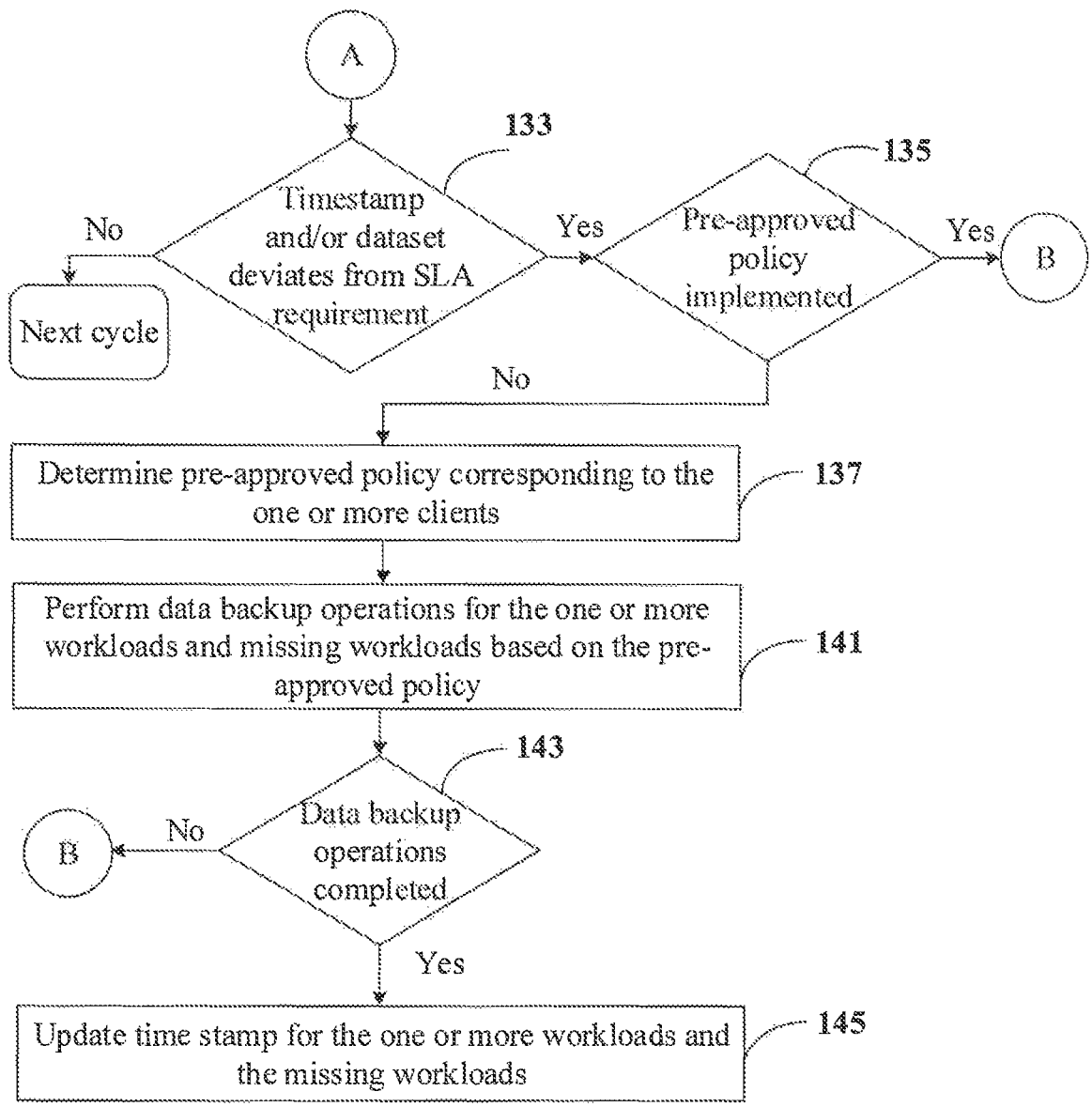

At block 133 as shown in the FIG. 1C, the processor 109 may check whether the timestamp and/or the dataset associated with the one or more workloads and the one or more missing workloads is in accordance with the SLA of the corresponding one or more clients. If the timestamp and/or the dataset deviates from the requirement of the SLA, the processor 109 may proceed to block 135 via "Yes". If the timestamp and/or the dataset does not deviate from the requirement of the SLA, the processor 109 may wait for the next cycle.

At block 135, the processor 109 may validate whether a pre-approved policy is implemented for the one or more clients. In some embodiments, the pre-approved policy may be the policy that is initially agreed by the client and a service provider. If the pre approved policy is implemented for the one or more clients, the processor 109 may proceed to block 147 via "Yes". If the pre-approved policy is not implemented for the one or more clients, the processor 109 may proceed to block 137 via "No".

At block 137, the processor 109 may determine the pre-approved policy corresponding to the one or more

TABLE 1

| Type of policy | Backup RPO | Backup Frequency | Retention at local site | Retention at Remote site | Weightage level |
|---|---|---|---|---|---|
| Gold level protection policy | 4 hrs | Every 2 hours | 60 days | 180 days | 1 |
| Silver level protection policy | 24 hours | Every 12 hours | 60 days | 60 days | 2 |
| Bronze level protection policy | 24 hours | Every 24 hours | 30 days | Not Applicable | 3 |

In some embodiments, the one or more policies may be predefined policies. In some other embodiments, the one or more policies may be dynamically configured in absence of the one or more predefined policies.

At block 129, the processor 109 may perform data backup operations for the one or more missing workloads based on the one or more parameters. In some embodiments, the data backup operations may include, but not limited to, backing up the one or more workloads and the one or more missing workloads using the backup module 103, determining whether the data backup operations meet requirement of the SLA, eliminating gap in rectifying one or more errors, automatically rectifying one or more errors based on one or more error rectification solutions and performing self-learning to generate the one or more error rectification solutions. In some embodiments, upon performing the backup, the one clients. In some embodiments, if the predefined policy does not exist, the processor 109 may dynamically generate a policy which adheres with the SLA.

At block 141, the processor 109 may perform the data backup operations for the one or more workloads and the one or more missing workloads of the one or more clients by implementing the pre-approved policy.

At block 143, the processor 109 may check whether the data backup operations are completed successfully. If the data backup operations are completed successfully, the processor 109 may proceed to block 145 via "Yes". If the data backup operations are not completed successfully, the processor 109 may proceed to block 147 (B) via "No".

At block 145, the processor 109 may update the one or more workloads and the one or more missing workloads with a current timestamp. In some embodiments, the current timestamp may meet the requirement of the SLA.

Figure 1D:
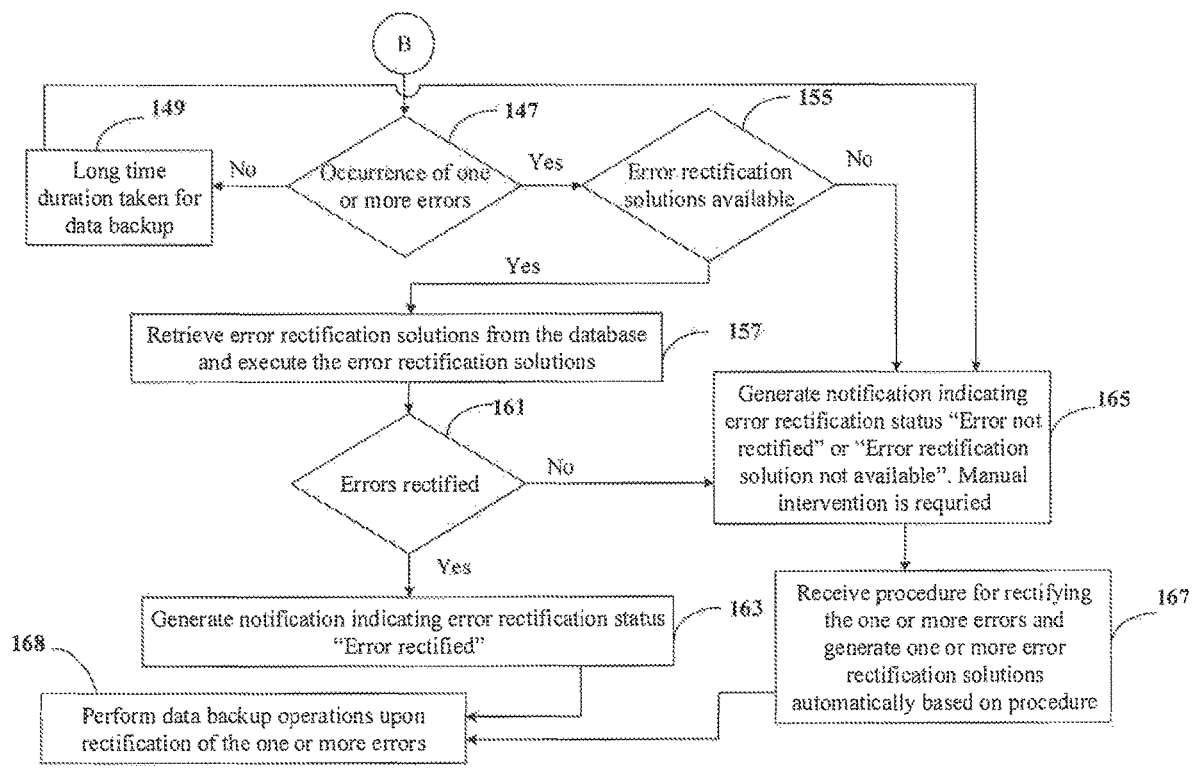

At block 147 as shown in the FIG. 1D, the processor 109 may check for occurrence of one or more errors occurring due to failure in the implementation of the pre-approved policy or due to the failure in performing the data backup operations. If the one or more errors occurs, the processor 109 may proceed to block 155 via "Yes". If the one or more errors did not occur, the processor 109 may proceed to block 149 via "No".

At block 149, the processor 109 may report that a long time duration was taken for performing the data backup operations. Upon reporting the long time duration taken for performing the data backup operations, the processor 109 may proceed to block 165.

At block 155, the processor 109 may check for availability of one or more error rectification solutions in the database 108 associated with the backup automation system 107. If the one or more error rectification solutions are available in the database 108, the processor 109 may proceed to block 157 via "Yes". If the one or more error rectification solutions are not present in the database 108, the processor 109 may proceed to block 165 via "No".

At block 157, the processor 109 may retrieve the one or more error rectification solutions from the database 108 and execute the one or more error rectification solutions to automatically rectify the one or more errors.

At block 161, the processor 109 may check whether the one or more error rectification solutions successfully rectified the one or more errors. If the one or more error rectification solutions rectified the one or more errors, the processor 109 may proceed to block 163 via "Yes". If the one or more error rectification solutions failed to rectify the one or more errors, the processor 109 may proceed to block 165 via "No".

At block 163, the processor 109 may generate a notification indicating an error rectification status upon executing the one or more error rectification solutions. As an example, the error rectification status may indicate "Error rectified". Upon rectification of the one or more errors, the processor 109 may proceed to block 168.

At block 165, the processor 109 may generate a notification. In some embodiments, the notification may indicate requirement of manual interference for rectifying the one or more errors. In some embodiments, the notification may indicate an exemplary message such as "Error rectification failed. Contact administrator for further assistance". In some other embodiments, the notification may indicate an exemplary message such as "Error rectification solution unavailable. Contact administrator for further assistance".

At block 167, the processor 109 may receive procedure for rectifying the one or more errors from the administrator and may perform self-learning to generate one or more error rectification solutions automatically based on the procedure. Upon rectification of the one or more errors, the processor 109 may proceed to block 168.

At block 168, the processor 109 may perform data backup operations that had previously failed due to the occurrence of the one or more errors.

Figure 2:
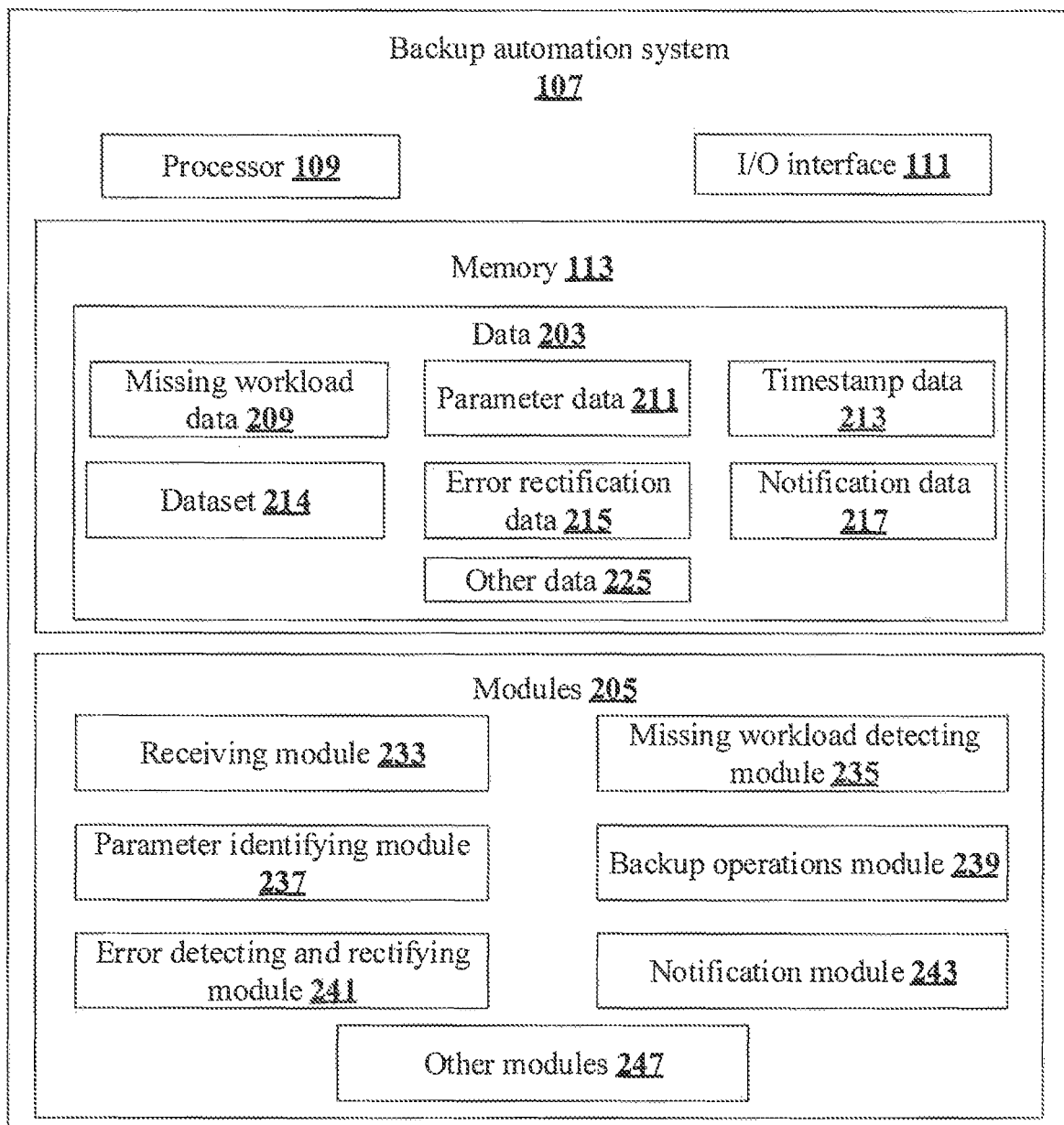
FIG. 2 shows a detailed block diagram of a backup automation system for automating data backup in Hybrid Cloud and Data Centre (DC) environment in accordance with some embodiments of the present disclosure.

FIG. 2 shows a detailed block diagram of a backup automation system for automating data backup in Hybrid Cloud and Data Centre (DC) environment in accordance with some embodiments of the present disclosure.

In some implementations, the backup automation system 107 may include data 203 and modules 205. As an example, the data 203 is stored in the memory 113 configured in the backup automation system 107 as shown in the FIG. 2. In one embodiment, the data 203 may include missing workload data 209, parameter data 211, timestamp data 213, dataset 214, error rectification data 215, notification data 217 and other data 225. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 225 may store data, including temporary data and temporary files, generated by the modules 205 for performing the various functions of the backup automation system 107.

In some embodiments, the data 203 stored in the memory 113 may be processed by the modules 205 of the backup automation system 107. The modules 205 may be stored within the memory 113. In an example, the modules 205 communicatively coupled to the processor 109 configured in the backup automation system 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 233, a missing workload detecting module 235, a parameter identifying module 237, a backup operations module 239, an error detecting and rectifying module 241, a notification module 243 and other modules 247. The other modules 247 may be used to perform various miscellaneous functionalities of the backup automation system 107. It will be appreciated that such aforementioned modules 205 may be represented as a single module or a combination of different modules.

In some embodiments, the receiving module 233 may receive a latest backup report corresponding to one or more clients from a backup module 103 associated with the backup automation system 107. The latest backup report may be received as a result of querying for the latest backup report by the processor 109. In some embodiments, the latest backup report comprises data of one or more workloads associated with the one or more clients.

In some embodiments, the missing workload detecting module 235 may detect one or more missing workloads in the latest backup report. The one or more missing workloads may be stored as the missing workload data 209. Initially, the missing workload detecting module 235 may compare the latest backup report with a master inventory report to detect the one or more missing workloads in the latest backup report. In some embodiments, the one or more missing workloads may include one or more workloads not present in the latest backup report. In some other embodiments, the one or more missing workloads may include one or more workloads having a non-compliant timestamp and/or dataset with respect to Service Level Agreement (SLA) of the corresponding one or more clients. In some embodiments, the master inventory report may include complete record of the one or more workloads of the one or more clients, provisioned for the data backup. In an exemplary scenario, the master inventory report may be used for billing the one or more clients who have opted for data backup of their corresponding one or more workloads. Further, in some embodiments, the master inventory report may be a combined workload provisioned list from Hybrid Cloud and DC management portal appended with corresponding SLA of each of the one or more workloads.

In some embodiments, the parameter identifying module 237 may identify one or more parameters corresponding to the one or more missing workloads. The one or more parameters may be stored as the parameter data 211. In some embodiments, the one or more parameters may include, hut not limited to, SLA of the one or more clients, environment related to the one or more missing workloads, type of the one or more missing workloads and, type of policies associated with the one or more missing workloads, that are aligned to adhere with the SLA. As an example, the environment related to the one or more missing workloads may be a virtual environment, a database environment, a testing environment, a cloud environment and the like. As an example, type of the workloads may be transactional workloads, business-critical workloads, disaster recovery workloads, web application related workloads and the like. As an example, the type of policies may be named as "Gold level protection policy", "Silver level protection policy", "bronze level protection policy" and the like. Each type of the policy may include a set of instructions that may be referred while performing data backup operations.

In some embodiments, the backup operations module 239 may perform data backup operations for the one or more missing workloads based on the one or more parameters. In some embodiments, the data backup operations may include, but not limited to, backing up the one or more workloads and the one or more missing workloads using the backup module 103, determining whether the data backup operations meet requirement of the SLA, eliminating gap in rectifying one or more errors, automatically rectifying the one or more errors based on one or more error rectification solutions and performing self-learning to generate the one or more error rectification solutions. Initially, the backup operations module 239 may automatically perform data backup of the one or more missing workloads through the backup module 103. Further, the backup operations module 239 may update timestamp for each of the one or more missing workloads upon successful completion of the automatic data backup of the one or more missing workloads. In some embodiments, the timestamp associated with each of the one or more workloads and the one or more missing workloads may be stored as the timestamp data 213. Further, along with the timestamp, each of the one or more workloads and the one or more missing workloads may be associated with dataset 214 that may include information related to specific folders that may have to be backed up in accordance with the SLA. As an example, in windows servers, dataset 214 could be a C Drive, D drive, E drive or any other drive that needs to be backed up. Further, as an example, in Unix systems, dataset 214 could be file systems or directory structures that needs to be hacked up.

Further, the backup operations module 239 may verify whether the timestamp and/or the dataset 214 associated with the one or more workloads and the one or more missing workloads, adheres to requirement of the SLA of corresponding one or more clients. As an example, the pre-approved policy may demand backing up the one or more workloads every 2 hours. If the timestamp indicates that the backup was performed after 4 hours from the last backup, the timestamp may be considered to be deviating from the requirement of the SLA. In some embodiments, the timestamp may deviate from the requirement of the SLA, due to occurrence of either of two conditions mentioned below, which is validated by the backup operations module 239. In a first condition, a pre-approved policy may not be implemented for performing the automated data backup. In some embodiments, the pre-approved policy may be the policy that is initially agreed by the client and a service provider. In a second condition, the pre-approved policy may be implemented, but, there might be a potential failure while performing the automated data backup.

When the backup operations module 239 detects that the pre-approved policy was not implemented, the backup operations module 239 may determine the pre-approved policy corresponding to the one or more clients. In some embodiments, the pre-approved policy may be a predefined policy present in the SLA. In some embodiments, if the predefined policy does not exist, the backup operations module 239 may dynamically generate a policy which adheres to the SLA and store the dynamically generated policy as part of the parameter data 211. Further, the backup operations module 239 may perform the data backup operations for the one or more workloads and the one or more missing workloads of the one or more clients, using the backup module 103, by implementing the pre-approved policy. Further, the backup operations module 239 may update the one or more workloads and the one or more missing workloads with a current timestamp that adheres with the requirement of the SLA.

On the other hand, when the backup operations module 239 detects that the pre-approved-policy was implemented but, there was a potential failure while performing the automated data backup, the error detecting and rectifying module 241 may detect occurrence of one or more errors that caused the potential failure. In some embodiments, the potential failure may be at least one of, failure in the implementation of the pre-approved policy or, failure in performing the data backup operations. Upon detecting the one or more errors, the error detecting and rectifying module 241 may check for availability of one or more error rectification solutions in a database 108 associated with the backup automation system 107. If the one or more error rectification solutions are available in the database 108, the error detecting and rectifying module 241 may retrieve the one or more error rectification solutions from the database 108. The one or more error rectification solutions may be stored as the error rectification data 215. Further, the error detecting and rectifying module 241 may execute the one or more error rectification solutions to automatically rectify the one or more errors.

In some embodiments, upon executing the one or more error rectification solutions, the notification module 243 may generate a notification indicating an error rectification status. As an example, when the one or more error rectification solutions rectify the one or more errors, the notification module 243 may generate the notification indicating the error rectification status as "Error rectified". As an example, when the one or more error rectification solutions fail to rectify the one or more errors, the notification module 243 may generate the notification indicating the error rectification status as "Error rectification failed. Contact administrator for further assistance". In some embodiments, messages contained in the error rectification status may be pre-stored as the notification data 217. When the one or more error rectification solutions fail to rectify the one or more errors, an administrator or a user may manually rectify the one or more errors that require manual interference. The procedures implemented manually for rectifying the one or more errors may be stored in the database 108. In some embodiments, the error detecting and rectifying module 241 may automatically create new error rectification solutions or may update/modify the one or more error rectification solutions based on the procedures stored by the administrator.

Henceforth, the process of automating data backup in Hybrid Cloud and DC environment is explained with the help of one or more examples for better understanding of the present disclosure. However, the one or more examples should not be considered as limitation of the present disclosure.

Consider an exemplary scenario in a Hybrid Cloud environment, where the master inventory report includes one or more workloads associated with the one or more clients and the corresponding SLA as shown in the below Table 2.

TABLE 2

| WORKLOADS | CLIENT | SLA |
|---|---|---|
| Workload 1 | Client A | SLA 1 |
| Workload 2 | Client A | SLA 1 |
| Workload 3 | Client A | SLA 1 |
| Workload 4 | Client B | SLA 2 |
| Workload 5 | Client C | SLA 3 |
| Workload 6 | Client C | SLA 3 |
| Workload 7 | Client D | SLA 4 |

Upon querying the backup module 103, consider the latest backup report obtained from the backup module 103 comprises the one or more workloads along with the timestamp as shown in the below Table 3.

TABLE 3

| WORKLOADS | Timestamp (hh:mm:ss) |
|---|---|
| Workload 1 | 09:30:56 |
| Workload 2 | 09:31:00 |
| Workload 4 | 06:30:55 |
| Workload 5 | 09:34:35 |
| Workload 6 | 09:45:40 |
| Workload 7 | 09:47:50 |

The processor 109 may compare the latest backup report with the master inventory report to detect the one or more missing workloads. Based on the comparison, the processor 109 detects that "Workload 3" is not present in the latest backup report. Also, the processor 109 detects that "Workload 4" is having a non-compliant timestamp with respect to the SLA 2 of Client B. Consider that as per the SLA 2, "Workload 4" should be backed up every 2 hours. The timestamp indicates that the last backup of the "Workload 4" was performed at time "06:30:55". Also, the timestamp associated with the other workloads in Table 3 indicates that the current time is around 9:47 AM. Therefore, the processor 109 may infer that "Workload 4" has not been backed up for more than 3 hours which is past the time duration mentioned in the SLA 2, thereby resulting in a non-compliant timestamp.

Further, the processor 109 may identify one or more parameters corresponding to the "Workload 3" and "Workload 4" as shown in the below Table 4.

TABLE 4

| MISSING WORKLOADS | CLIENT | SLA | ENVIRONMENT OF MISSING WORKLOAD | TYPE OF MISSING WORKLOAD | TYPE OF POLICY |
|---|---|---|---|---|---|
| Workload 3 | Client A | SLA 1 | Testing | Transactional | Gold level protection |
| Workload 4 | Client B | SLA 2 | Testing | Transactional | Silver level protection |

Upon identifying the one or more parameters corresponding to the one or more missing workloads, the processor 109 may performs the automatic data backup of the one or more missing workloads based on the one or more parameters. Further, the processor 109 may update the timestamp for each of the one or more missing workloads upon completion of the automatic data backup.

Further, the processor 109 may verify whether the updated timestamp associated with each of the one or more workloads adheres to the requirement of the SLA. Consider that the timestamp associated with "WORKLOAD 7" does not adhere with the requirement of the corresponding SLA 4. SLA 4 mentions the "Silver level protection policy" for the "WORKLOAD 7" associated with the "Client D". Consider that according to the "Silver level protection policy", the "WORKLOAD 7" should be backed up every 1 hour. However, the timestamp associated with the "WORKLOAD 7" indicates that the data backup operations were performed every 30 minutes which is generally performed for the one or more clients who have opted for "Gold level protection policy". Therefore, the processor 109 may identify and implement the pre-approved policy i.e. the "Silver level protection policy" for the "WORKLOAD 7" associated with the "Client D" and update "WORKLOAD 7" with the current timestamp that meets the requirement of the SLA.

In one scenario, consider that the timestamp corresponding to the "WORKLOAD 7" is incorrect even when the pre-approved policy was implemented for the "WORKLOAD 7" associated with the "Client D". Also, the processor 109 may detect failure in the data backup operations when the pre-approved policy was implemented due to occurrence of a system error. The processor 109 may retrieve one or more error rectification solutions corresponding to the system error, from the database 108. The processor 109 may execute the one or more error rectification solutions to rectify the system error. If the system error is rectified, the processor 109 may generate a notification indicating the error rectification status as "Error rectified". If the system error is not rectified, the processor 109 may generate a notification indicating the error rectification status as "Error rectification failed. Contact administrator for further assistance".

Further, consider another scenario to illustrate a non-compliant dataset in accordance with the SLA. Upon querying the backup module 103, consider the latest backup report obtained from the backup module 103 includes the one or more workloads along with the timestamp and the dataset 214 as shown in the below Table 5.

TABLE 5

| WORKLOADS | Timestamp (hh:mm:ss) | Dataset |
| --- | --- | --- |
| Workload 1 | 09:30:56 | C drive |
| Workload 2 | 09:31:00 | C drive |
| Workload 4 | 06:30:55 | C drive |
| Workload 5 | 09:34:35 | D drive |
| Workload 7 | 09:47:50 | C drive |

Upon comparing the latest backup report with the master inventory report as shown in the Table 2, the processor 109 may detect that the "D drive" belonging to "Workload 5" is backed up. However, according to the SLA 3, the "C drive" belonging to "Workload 5" should be backed up. Therefore, the processor 109 detects a non-compliant dataset which is backed up. Also, according to the SLA 3, all the workloads belonging to Workload 5 should be backed up. However, the latest backup report does not include C drive which belongs to "Workload 6". Therefore, the processor 109 detects another non-compliant dataset, since "Workload 6" is not backed up.

Further, the processor 109 may identify one or more parameters related to the "Workload 5" and "Workload 6" and perform rest of the method steps as described above in the previous scenario, to automate the data backup operations in accordance with the SLA of the respective one or more clients.

Figure 3:
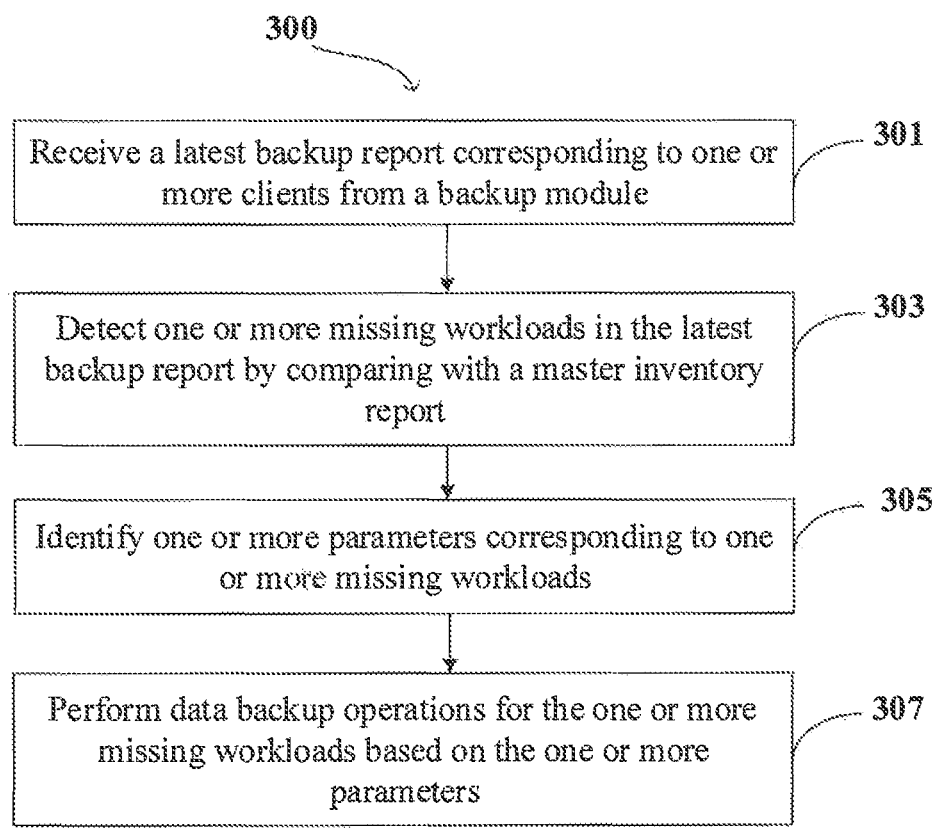
FIG. 3 shows a flowchart illustrating a method of automating data backup in Hybrid Cloud and Data Centre (DC) environment in accordance with some embodiments of the present disclosure.

FIG. 3 shows a flowchart illustrating a method of automating data backup in Hybrid Cloud and Data Centre (DC) environment in accordance with some embodiments of the present disclosure.

As illustrated in FIG. 3, the method 300 includes one or more blocks illustrating a method of automating data backup in Hybrid Cloud and Data Centre (DC) environment. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the backup automation system 107, a latest backup report corresponding to one or more clients from a backup module 103 associated with the backup automation system 107. In some embodiments, the latest backup report may include data of one or more workloads associated with the one or more clients.

At block 303, the method 300 may include detecting, by the processor 109, one or more missing workloads in the latest backup report by comparing the latest backup report with a master inventory report. In some embodiment, the one or more missing workloads may be one or more workloads not present in the latest backup report. In some other embodiments, the one or more missing workloads may be one or more workloads having a non-compliant timestamp and/or dataset 214 with respect to Service Level Agreement (SLA) of the corresponding one or more clients.

At block 305, the method 300 may include, identifying, by the processor 109, one or more parameters corresponding to the one or more missing workloads. As an example, the one or more parameters may include, but not limited to, SLA of the one or more clients, environment related to the one or more missing workloads, type of the one or more missing workloads, and, type of one or more policies associated with the one or more missing workloads, which are aligned to adhere with the SLA.

At block 307, the method 300 may include, performing, by the processor 109, data backup operations for the one or more missing workloads based on the one or more parameters. In some embodiments, the data backup operations may include, but not limited to, backing up the one or more workloads and the one or more missing workloads in the backup module 103, determining whether the data backup operations meet requirement of the SLA, eliminating gap in rectifying one or more errors, automatically rectifying the one or more errors based on one or more error rectification solutions, and performing self-learning to generate the one or more error rectification solutions. Further, the processor 109 may update timestamp for each of the one or more missing workloads upon completion of the data backup operations for automating the data backup. In some embodiments, when the processor 109 encounters one or more errors while performing the data backup operations, the processor 109 may check for availability of one or more error rectification solutions in a database 108 associated with the backup automation system 107. Further, the processor 109 may retrieve the one or more error rectification solutions from the database 108 and execute the one or more error rectification solutions to automatically rectify the one or more errors. Further, the processor 109 may generate a notification indicating an error rectification status upon executing the one or more error rectification solutions. As an example, the error rectification status may indicate "Error rectified".

In some embodiments, when the one or more error rectification solutions are unavailable in the database or when the one or more error rectification solutions fail to rectify the one or more errors, the processor 109 may generate another notification indicating requirement of manual interference for rectifying the one or more errors. Further, the processor 109 may receive a procedure followed by an administrator or a user to rectify the one or more errors and may generate new error rectification solution based on the procedure.

Figure 4:
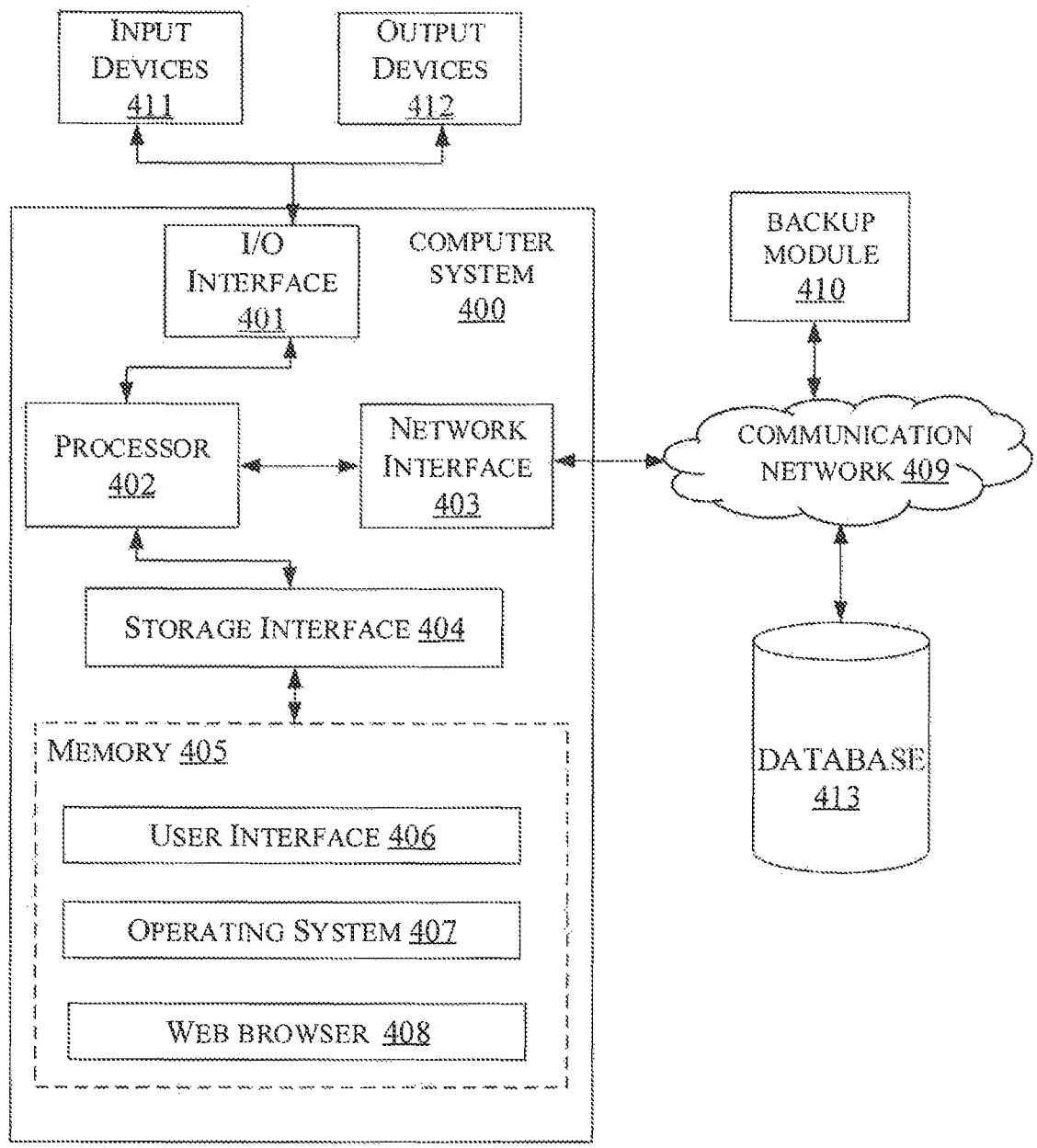
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be backup automation system 107 that is used for automating data backup in Hybrid Cloud and Data Centre (DC) environment. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a backup module 410 and a database 413. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

Operating system 407 may facilitate resource management and operation of computer system 400. Examples of operating systems include, without limitation. APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. User interface 406 may facilitate display, execution, interaction, manipulation, or operation of program components through textual or graphical facilities. For example, user interfaces may provide computer interaction interface elements on a display system operatively connected to computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

Computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. Computer system 400 may implement a mail server stored program component. The mail server may be an Internet mail server such as Microsoft Exchange, or the like. The mail server may utilize facilities such as ASP, ACTIVEX®, ANSI® C++/C#, MICROSOFT®, NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In some embodiments, the present disclosure provides a method and a system for automating data backup in Hybrid Cloud and Data Centre (DC) environment.

The present disclosure provides a feature wherein one or more missing workloads provisioned in the Hybrid Cloud and DC environment and supposed to be backed up are automatically detected using a master inventory report as opposed to existing techniques that use a backup database instead.

The present disclosure ensures successful backup of each of the one or more workloads, in accordance with the SLA, by automatically performing the data backup operations. The present disclosure not only performs automated data backup but also performs other data backup operations such as determining whether the data backup operations meet requirement of the SLA, eliminating gap in rectifying one or more errors, automatically rectifying the one or more errors based on one or more error rectification solutions and performing self-learning to generate the one or more error rectification solutions.

The present disclosure provides a fault resilient backup mechanism, since each of the one or more workloads are backed up and backed up in accordance with the SLA, of the corresponding one or more clients.

The present disclosure provides a feature wherein the one or more errors occurring in the data backup operations may be automatically detected and rectified.

The present disclosure provides a feature wherein the backup automation system may automatically create new error rectification solutions or may update/modify the one or more error rectification solutions based on the procedure stored by the administrator.

The present disclosure provides a feature wherein the data backup operations can be integrated with customer preferred platforms such as On-premises, public cloud and the like.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for automating data backup in Hybrid Cloud and Data Centre (DC) environment. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
| --- | --- |
| Reference Number | Description |
| 100 | Architecture |
| 101 | Storage unit |
| 103 | Backup module |
| 107 | Backup automation system |
| 108 | Database |
| 109 | Processor |
| 111 | I/O interface |
| 113 | Memory |
| 203 | Data |
| 205 | Modules |
| 209 | Missing workload data |
| 211 | Parameter data |
| 213 | Timestamp data |
| 214 | Dataset |
| 215 | Error rectification data |
| 217 | Notification data |
| 225 | Other data |
| 233 | Receiving module |
| 235 | Missing workload detecting module |
| 237 | Parameter identifying module |
| 239 | Backup operations module |
| 241 | Error detecting and rectifying module |
| 243 | Notification module |
| 247 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 410 | Backup module of the exemplary computer system |
| 411 | Input devices |
| 412 | Output devices |
| 413 | Database of the exemplary computing system |
| 414 | One or more local computing devices of the exemplary computing system |

What is claimed is:

1. A method of automating data backup in Hybrid Cloud and Data Centre (DC) environment, the method comprising:

receiving, by a backup automation system, a latest backup report corresponding to one or more clients from a backup module associated with the backup automation system, wherein the latest backup report comprises data of one or more workloads associated with the one or more clients;

detecting, by the backup automation system, one or more missing workloads in the latest backup report by comparing the latest backup report with a master inventory report, wherein the one or more missing workloads comprises at least one of a workload from the one or more workloads having a non-compliant timestamp and/or dataset with respect to Service Level Agreement (SLA) of the corresponding one or more clients, or a workload from the one or more workloads not present in the latest backup report;

identifying, by the backup automation system, one or more parameters corresponding to the one or more missing workloads; and performing, by the backup automation system, data backup operations for the one or more missing workloads based on the one or more parameters and updating timestamp for each of the one or more missing workloads upon completion of the data backup operations for automating the data backup.

2. The method as claimed in claim 1, wherein the master inventory report comprises complete record of the one or more workloads associated with the one or more clients, supposed to be provisioned for data backup.

3. The method as claimed in claim 1, wherein the one or more parameters comprises at least one of the SLA of the corresponding one or more clients, environment related to the one or more missing workloads, type of the one or more missing workloads, and type of one or more policies associated with the one or more missing workloads, which are aligned to adhere with the SLA.

4. The method as claimed in claim 1 further comprises:

verifying, by the backup automation system, whether the timestamp and/or the dataset associated with the one or more workloads and the one or more missing workloads, adheres to requirement of the SLA of the corresponding one or more clients;

validating, by the backup automation system, whether a pre-approved policy is implemented for the one or more clients, when the timestamp and/or the dataset deviates from the requirement of the SLA;

performing, by the backup automation system, the data backup operations for the one or more workloads and the one or more missing workloads of the one or more clients by implementing the pre-approved policy, when result of the validation is negative; and updating, by the backup automation system, the one or more workloads and the one or more missing workloads with current timestamp upon completion of the data backup operations, wherein the current timestamp meets the requirement of the SLA.

5. The method as claimed in claim 4, wherein the pre-approved policy is at least one of a predefined policy or dynamically configured in absence of the pre-approved policy.

6. The method as claimed in claim 4 further comprises:

retrieving, by the backup automation system, one or more error rectification solutions from a database associated with the backup automation system, upon occurrence of one or more errors due to at least one of failure in the data backup operations and, failure in the implementation of the pre-approved policy when the result of the validation is positive;

executing, by the backup automation system, the one or more error rectification solutions to automatically rectify the one or more errors; and generating, by the backup automation system, a notification indicating an error rectification status upon executing the one or more error rectification solutions.

7. The method as claimed in claim 6 further comprises generating, by the backup automation system, a notification indicating requirement of manual interference for rectifying the one or more errors when at least one of, the one or more error rectification solutions fail to rectify the one or more errors and, when the one or more error rectification solutions related to the one or more errors are unavailable in the database.

8. The method as claimed in claim 1, wherein the data backup operations comprises at least one of backing up the one or more workloads and the one or more missing workloads in the backup module, determining whether the data backup operations meet requirement of the SLA, eliminating gap in rectifying one or more errors, automatically rectifying the one or more errors based on one or more error rectification solutions, and performing self-learning to generate the one or more error rectification solutions.

9. A backup automation system for automating data backup in Hybrid Cloud and Data Centre (DC) environment, the backup automation system comprising:

a processor; and a memory communicatively coupled to the processor, wherein the memory stores the processor-executable instructions, which, on execution, causes the processor to:

receive a latest backup report corresponding to one or more clients from a backup module associated with the backup automation system, wherein the latest backup report comprises data of one or more workloads associated with the one or more clients;

detect one or more missing workloads in the latest backup report by comparing the latest backup report with a master inventory report, wherein the one or more missing workloads comprises at least one of a workload from the one or more workloads having a non-compliant timestamp and/or the dataset with respect to Service Level Agreement (SLA) of the corresponding one or more clients, or a workload from the one or more workloads not present in the latest backup report;

identify one or more parameters corresponding to the one or more missing workloads; and perform data backup operations for the one or more missing workloads based on the one or more parameters and updating timestamp for each of the one or more missing workloads upon completion of the data backup operations for automating the data backup.

10. The backup automation system as claimed in claim 9, wherein the master inventory report comprises complete record of the one or more workloads associated with the one or more clients, supposed to be provisioned for data backup.

11. The backup automation system as claimed in claim 9, wherein the one or more parameters comprises at least one of the SLA of the corresponding one or more clients, environment related to the one or more missing workloads, type of the one or more missing workloads and, type of one or more policies associated with the one or more missing workloads, which are aligned to adhere with the SLA.

12. The backup automation system as claimed in claim 9, wherein the processor is further configured to:

verify whether the timestamp and/or the dataset associated with the one or more workloads and the one or more missing workloads, adheres to requirement of the SLA of the corresponding one or more clients;

validate whether a pre-approved policy is implemented for the one or more clients, when the timestamp and/or the dataset deviates from the requirement of the SLA;

perform, the data backup operations for the one or more workloads and the one or more missing workloads of the one or more clients by implementing the pre-approved policy, when result of the validation is negative; and update one or more workloads and the one or more missing workloads with current timestamp upon completion of the data backup operations, wherein the current timestamp meets the requirement of the SLA.

13. The backup automation system as claimed in claim 12, wherein the pre-approved policy is at least one of a pre-defined policy or dynamically configured in absence of the pre-approved policy.

14. The backup automation system as claimed in claim 12, wherein the processor is further configured to:

retrieve one or more error rectification solutions from a database associated with the backup automation system, upon occurrence of one or more errors due to at least one of, failure in the data backup operations and, failure in the implementation of the pre-approved policy when the result of the validation is positive;

execute the one or more error rectification solutions to automatically rectify the one or more errors; and generate a notification indicating an error rectification status upon executing the one or more error rectification solutions.

15. The backup automation system as claimed in claim 14, wherein the processor is further configured to generate a notification indicating requirement of manual interference for rectifying the one or more errors when at least one of, the one or more error rectification solutions fail to rectify the one or more errors and, when the one or more error rectification solutions related to the one or more errors are unavailable in the database.

16. The backup automation system as claimed in claim 9, wherein the data backup operations comprises at least one of backing up the one or more workloads and the one or more missing workloads in the backup module, determining whether the data backup operations meet requirement of the SLA, eliminating gap in rectifying one or more errors, automatically rectifying the one or more errors based on one or more error rectification solutions, and performing self-learning to generate the one or more error rectification solutions.

17. A non-transitory computer readable medium storing instructions for automating data backup in Hybrid Cloud and Data Centre (DC) environment, which when executed by at least one processor causes a backup automation system to perform operations comprising:

receiving a latest backup report corresponding to one or more clients from a backup module associated with the backup automation system, wherein the latest backup report comprises data of one or more workloads associated with the one or more clients;

detecting one or more missing workloads in the latest backup report by comparing the latest backup report with a master inventory report, wherein the one or more missing workloads comprises at least one of a workload from the one or more workloads having a non-compliant timestamp and/or dataset with respect to Service Level Agreement (SLA) of the corresponding one or more clients, or a workload from the one or more workloads not present in the latest backup report;

identifying one or more parameters corresponding to the one or more missing workloads; and performing data backup operations for the one or more missing workloads based on the one or more parameters and updating timestamp for each of the one or more missing workloads upon completion of the data backup operations for automating the data backup.

18. The non-transitory medium as claimed in claim 17, wherein the instructions further cause the processor to:

verify whether the timestamp and/or the dataset associated with the one or more workloads and the one or more missing workloads, adheres to requirement of the SLA of the corresponding one or more clients;

validate whether a pre-approved policy is implemented for the one or more clients, when the timestamp and/or the dataset deviates from the requirement of the SLA;

perform the data backup operations for the one or more workloads and the one or more missing workloads of the one or more clients by implementing the pre-approved policy, when result of the validation is negative; and update the one or more workloads and the one or more missing workloads with current timestamp upon completion of the data backup operations, wherein the current timestamp meets the requirement of the SLA.

19. The non-transitory medium as claimed in claim 17, wherein the instructions further cause the processor to:

retrieve one or more error rectification solutions from a database associated with the backup automation system, upon occurrence of one or more errors due to at least one of, failure in the data backup operations and, failure in the implementation of the pre-approved policy when the result of the validation is positive;

execute the one or more error rectification solutions to automatically rectify the one or more errors; and generate a notification indicating an error rectification status upon executing the one or more error rectification solutions.

20. The non-transitory medium as claimed in claim 17, wherein the data backup operations comprises at least one of backing up the one or more workloads and the one or more missing workloads in the backup module, determining whether the data backup operations meet requirement of the SLA, eliminating gap in rectifying one or more errors, automatically rectifying the one or more errors based on one or more error rectification solutions, and performing self-learning to generate the one or more error rectification solutions.

* * * * *